United States Patent [19]

Alaily

[11] 3,875,347

[45] Apr. 1, 1975

[54] MULTIFREQUENCY SIGNAL RECEIVER

[75] Inventor: Jamil K. Alaily, La Grange, Ill.

[73] Assignee: GTE Automatic Electric Laboratories Incorporated, Northlake, Ill.

[22] Filed: Oct. 1, 1973

[21] Appl. No.: 402,517

[52] U.S. Cl. .......... 179/84 VF

[51] Int. Cl. .......... H04m 1/00

[58] Field of Search .......... 179/84 VF; 328/138; 340/171

[56] References Cited

UNITED STATES PATENTS

| | | | |
|---|---|---|---|
| 3,128,349 | 4/1964 | Boesch | 179/84 VF |
| 3,140,357 | 7/1964 | Bischof et al. | 179/84 VF |
| 3,571,522 | 3/1971 | Cox | 179/84 VF |
| 3,582,562 | 6/1971 | Sellari | 179/18 AD |
| 3,701,857 | 10/1972 | Wsuda | 179/84 VF |

*Primary Examiner*—Kathleen H. Claffy
*Assistant Examiner*—Joseph Popek
*Attorney, Agent, or Firm*—Robert J. Black

[57] ABSTRACT

A receiver for detection of multifrequency tones as used for signaling purposes in telecommunication systems. Active bandpass filters are employed with digital logic networks to make the circuitry independent of the inherent slow rise and ringing characteristics of the filters.

7 Claims, 2 Drawing Figures

MULTIFREQUENCY SIGNAL RECEIVER

BACKGROUND OF THE INVENTION

1. Field of the Invention

This invention relates to a receiver useful for detecting multifrequency tone signals as utilized for signaling in telecommunication systems.

2. Description of the Prior Art

At the present time it has become quite common to utilize for signaling in telecommunication systems of both voice and data types, a technique known as multifrequency (MF) signaling in place of the more common DC loop pulsing technique. In multifrequency tone signaling schemes a fairly common arrangement involves the utilization of equipment to transmit and receive six different tone signals. Typically these signals are at frequencies of 700 Hz, 900 Hz, 1,100 Hz, 1,300 Hz, 1,500 Hz and 1,700 Hz. In the usual arrangement two different tone signals are transmitted by a transmitter to a distant receiver, for each digit of a desired telephone subscriber's number or data character. For example, the digit 1 might be a combination of 700 Hz and 900 Hz tones. Tone receivers at the distant point in the telecomunnication network receive these two signals and perform the necessary translation for operation of switching equipment in accordance with the transmitted digit. For proper operation the tones must be separated and evaluated by this receiver.

The present multifrequency receivers would appear to follow two general schemes. In one scheme the signal is filtered first by means of a bankpass bandpass then it is amplitude limited by a limiter network in order to standardize the amplitude. The second common scheme is the reverse of the first except that it uses an automatic gain control amplifier to standardize the amplitude. Timing, parity checking and output driving circuits which are common to both schemes are used in many different manners to determine the validity of the tones. An example of the first scheme is illustrated in U.S. Pat. No. 3,582,565 issued to R. H. Beeman, R. V. Burns and R. T. Cleary on June 1, 1971. Examples of the second scheme are illustrated in U.S. Pat. No. 3,539,731, issued to Z. Legedza on Nov. 10, 1970 and U.S. Pat. No. 3,319,011 issued to J. Maurushat, Jr. on May 9, 1967.

SUMMARY OF THE INVENTION

An incoming signal from the communication line consisting of two tone signals is first amplified and then applied to the inputs of a plurality of bandpass flters, each one having a characteristic passband frequency of one of the two tones expected to be received in the MF signaling scheme. The amplified signal is also applied to a full wave rectifier whose output is then passed to an integrator and then coupled to an inverter. The rectifier/integrator/inverter combination changes the composite tone pulses received to a DC voltage level which varies directly with the amplitude of the incoming MF pulses.

While the incoming signals are present at the input of all the bandpass filters only those filters corresponding to the two tone signals included in the incoming signal will appear at the outputs of their corresponding filters. The other filters will act to attenuate the incoming signal, with essentially no output being obtained from those filters. At this point two sinusoidal signals of two different frequencies are available at the output of two of the bandpass filters, with both signals varying directly in amplitude with the input. The output of each filter is applied to a comparator circuit as is the DC voltage output from the rectifier/integrator/inverter chain described previously. Therefore both inputs to each comparator are essentailly always tracking each other.

The DC level of input may be adjusted by an associated potentiometer at the input of the comparator circuit and this adjustment will determine the amount of delay at the comparator output. Potentiometers are set so that the output swings to a plus supply voltage within $T_0$ and $T_2$; providing at this setting the circuitry can respond to a change of 0 to −22.5 dB in amplitude of the MF pulses.

Each comparator circuit is followed by a conventional inverter whose outputs in turn are applied to the inputs of retriggerable monostable multivibrators or "one shots." Also connected to the input amplifier previously described is a second amplifier whose output it taken through two stages of inversion and applied simultaneously to the inputs of a retriggerable monostable multivibrator and a nonretriggerable monostable multivibrator. The output of the retriggerable monostable multivibrator is applied to a plurality of gate circuits each of which are connected by a second input to the 1 or true output of each of the previously described monostable multivibrators. The complementary or 0 output of each of the previously described multivibrators are also gated to a single retriggerable monostable multivibrator to act as an inhibit signal source. Each of the aforementioned gate circuits is coupled through an associated inverter circuit to one input of an associated output gate circuit. The second input to each of the output gates is connected to the output of the nonretriggerable multivibrator noted previously. Outputs from each of the output gate circuits are coupled to switching control equipment or data decoding equipment as required.

Because the signal level at the output of the bandpass filters is measured against a variable voltage level derived from the input signal this produces an output signal with fixed delay. This delay which is due to the ringing of the filter is independent of the input amplitude variation. This makes the following logic circuitry more simple, more reliable and requires less components than would otherwise be the case if the output of the filter were compared to a fixed voltage level derived from a power supply as taught in U.S. Pat. No. 3,710,031.

Furthermore the edge triggered logic circuitry as outlined above starts the timing cycle at that time where the amplitude of the filter output is stabilized and stops the cycle when the input signal of the filter has ended. This produces a signal which is independent of the ringing slow rise of the filter output and is independent of the level of the input signal.

DESCRIPTION OF THE PREFERRED EMBODIMENT

Figure 1:
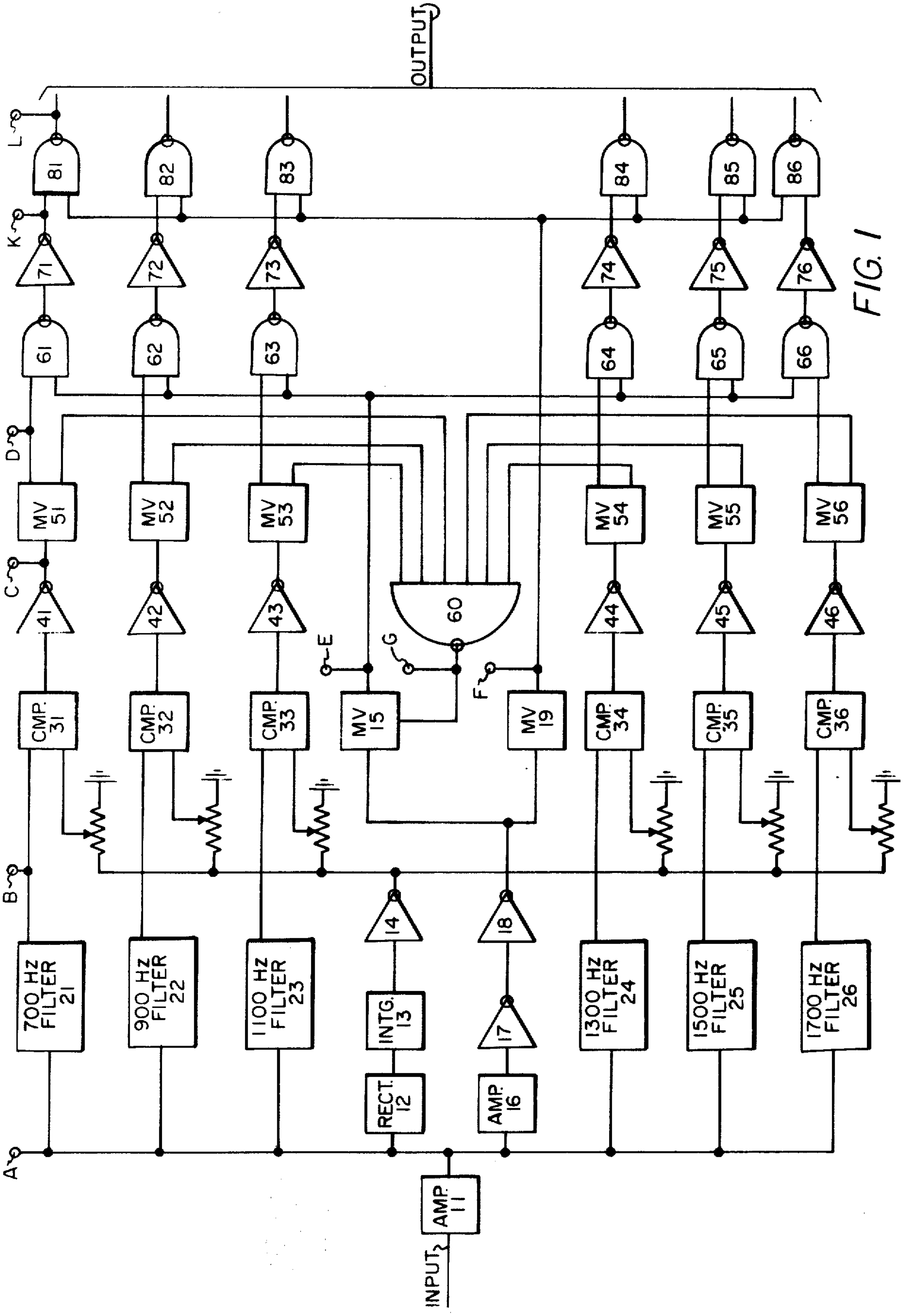
FIG. 1 is a logic diagram of a multifrequency signal receiver in accordance with the present invention.

Referring now to FIG. 1 it should be noted that the detailed circuitry of the various amplifiers, inverters, rectifiers, integrators, compartors and gate circuitry have not been shown. Inasmuch as the detailed circuitry thereof is conventional in nature and does not form a portion of the present invention. The only requirement for each of these circuits is that they perform the functions as outlined in the following description.

For purposes of the following description it is to be assumed that an input signal representative of the digit 1 and consisting of a 700 Hz tone and a 900 Hz tone are applied to the input of amplifier 11. Operation for other tone combinations representative of other digits will be obvious from the following description.

Initially a composite signal consisting of a 700 Hz tone and a 900 Hz tone are applied on the input lead to amplifier 11. This amplifier is conventional in nature and provides a gain of three.

Figure 2:
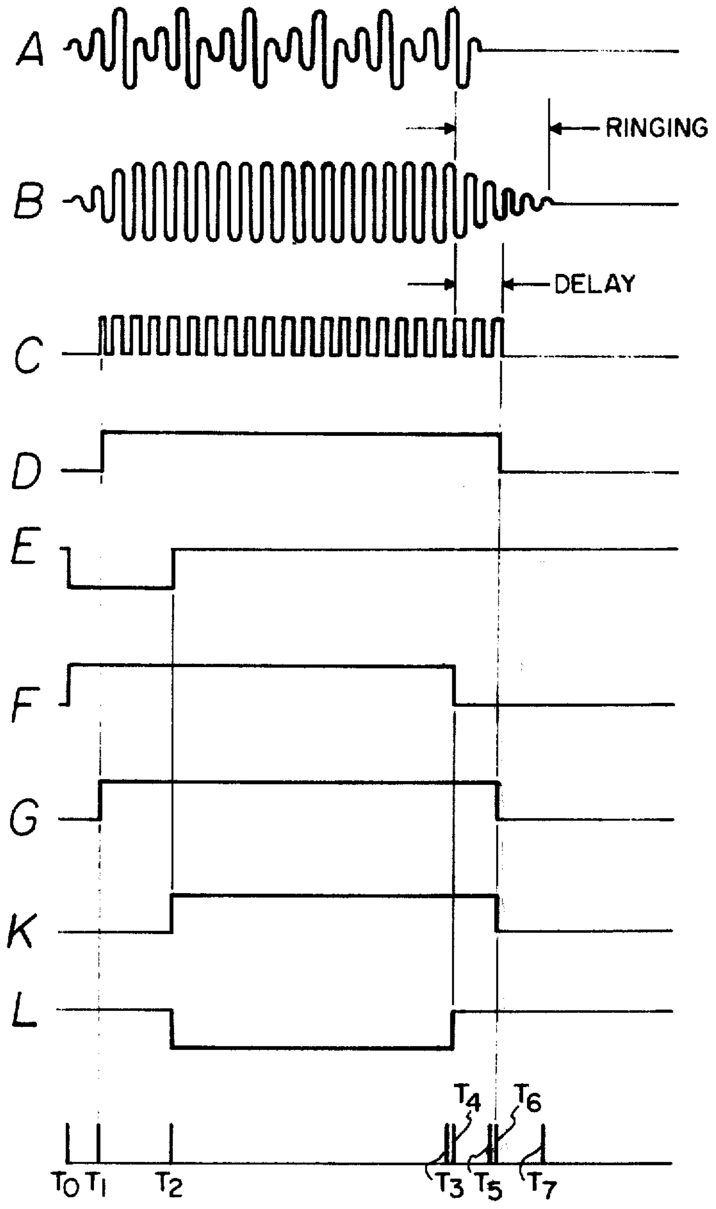
FIG. 2 is a chart of waveforms available at various stages in the multifrequency receiver of the present invention.

The signal which appears at the output of amplifier 11 and at test point A is that shown in the waveform A of FIG. 2. This signal is applied simultaneously to the six bandpass filters 21–26 inclusive. This signal is also fed to a full wave rectifier 12 whose output is connected to integrator 13, the output of which is connected to inverter 14. The full wave rectifier 12, integrator 13 and inverter 12 all employ conventional circuitry and as shown connected in series, changes the composite tone pulses received to a DC voltage level which varies directly with the input multi-frequency pulses.

Although the signal from the output of amplifier 11 is present at the input of the six bandpass filters 21–26 inclusive, only 700 Hz filter 21 and 900 Hz filter 22 will pass a portion of the incoming signal and produce and output amplified one and one-half times. The other four filters, 23–26 inclusive attenuate the incoming signal by at least 26 dB (which is considered 0 level). At this point the output from filters 21 and 22 are two sinusoidal signals, one of 700 Hz at the output of filter 21 and the other of 900 Hz at the output of filter 22. Their waveform is similar to that shown in waveform B, FIG. 2. Each of these signals will vary directly in amplitude with the input signal.

These two output signals are then connected to comparator circuits 31 and 32 respectively. Through potentiometers R1 and R2 the DC signal from inverter 14 is also applied to comparators 31 and 32 respectively. Because of this both inputs (of both comparators 31 and 32) are always tracking each other, and the setting of potentiometers R1 and R2 at the inputs of comparators 31 and 32 respectively determine the amount of delay at their outputs. The potentiometers are set so that the output of their associated inverters 41 and 42 respectively swing to a positive supply voltage within times $T_0$ and $T_2$ provided that at this setting the circuits are designed to respond to a change of 0 to −22.5 dB in amplitude of the multifrequency pulses, and a twist between the two tones of 6.5 dB maximum.

The inverters 41 and 42 each consist of a single transistor stage producing at their output a square wave signal like that shown at C in FIG. 2. This signal is suitable for triggering the retriggerable monostable multivibrators 51 and 52 respectively. In each of these multivibrators the delay time is equal to $T_5–T_4$ which is of shorter duration than the ringing period ($T_7–T_3$). Since the RC time constant of multivibrators 51 and 52 is larger than the period of the square pulses at the output of inverters 41 and 42 both multivibrators 51 and 52 will be retriggered before they timeout. Their outputs (1) will be shown by waveform D in FIG. 2, which starts at $T_1$ and ends at $T_6$. The waveform at the output of both multivibrators 51 and 52 will be identical.

Amplifier 16 whose input is connected to the output of amplifier 11, is driven into saturation and cut off by the composite signal appearing at the output of amplifier 11. The output of amplifier 16 is applied to inverters 17 and 18 in series to provide a suitable signal to trigger retriggerable monostable vibrator 19 and retriggerable monostable vibrator 15, simultaneously. The RC time constant of monostable multivibrator 19 is slightly larger than the period of the square wave pulses at the output of inverter 18. Therefore monostable vibrator 19 will be retriggered before it times out, and its output will be shown in FIG. 2 at waveform F, starting at $T_0$ and ending at $T_2$.

The non-retriggerable monostable multivibrator 15 starts its timing cycle at $T_0$ and ends at $T_2$. It is inhibited at $T_1$ (which lies between the period $T_2–T_0$) by the output of gate 60 whose waveform is like that shown at G in FIG. 2. The output of gate 60 is produced by gating the complementary or 0 outputs of multivibrators 51 and 52. Although a trigger pulse is present at the input of non-retriggerable monostable multivibrator 15 at the end of its timing cycle (after $T_2$), it will not trigger because it will be inhibited during this time.

During the period $T_2–T_0$, the output of filters 21 and 22 will each reach a stable amplitude. The output of multivibrators 51 and 52 respectively and the output of multivibrator 15 are gated by gates 61 and 62 respectively. These output are inverted by inverters 71 and 72 to produce waveforms like that shown at K in FIG. 2. The outputs of inverters 71 and 72 are applied to gates 81 and 82 each of which also has an input connected to the output of multi-vibrator 19, thus the waveforms as shown at K and F in FIG. 2 are gated to produce the output signals which are applied to other decoding or switching equipment as required. The output pulses appearing at the outputs of gates 81 and 82 are shown at L in FIG. 2.

The waveform shown at L in FIG. 2 which starts at $T_2$ and ends at $T_4$ is actually independent of the slow rise and ringing in the filter output. This characteristic of slow rise and ringing is characteristic of filter circuitry. Therefore the wave forms as shown at L and appearing at the output of gates 81 and 82 are indication of 700 Hz tone and 900 Hz tone respectively.

The outputs of gates 81 and 82 as well as 83–86 inclusive may be processed by other logic circuits and timers in order to complete the multifrequency tone receptions.

What is claimed is:

1. A receiver for detection of multifrequency tone signals comprising: a plurality of comparator circuits; a plurality of tone responsive circuits, each connected between a common source of multifrequency tone signals and a different one of said comparator circuits and each operated in response to receipt of a different single frequency tone signal, to couple said received signal to said connected comparator circuit; rectifier means connected between said source of multifrequency tone signals and each of said comparator circuits, operated in response to said multifrequency tone signals to couple a direct current potential corresponding in amplitude to the amplitude of said multifrequency tone signals to each of said comparator circuits; whereby said comparator circuit in response to a single frequency tone signal and DC potential from said rectifier means, generates an output signal of fixed delay; output means connected to the output of each of said comparator circuits, comprising:

a first trigger circuit connected to said source of multifrequency tone signals, said trigger circuit operated in response to a multifrequency tone signal to generate a trigger pulse of predetermined duration; a first plurality of gate circuits each connected to a different one of said comparator circuits and each connected to said first trigger circuit, each of said gate circuits operated in response to coincidence of an output signal from said connected comparator circuit and said first trigger pulse to generate an output signal of fixed duration.

2. A receiver as claimed in claim 1 wherein said output means further include a second trigger circuit connected to said source of multifrequency tone signals operated in response to a multifrequency tone signal to generate a second trigger pulse of duration equivalent to said multifrequency tone signal; a second plurality of gate circuits each connected to a different one of said first gate circuits and each connected to said second trigger circuit, each of said gate circuits operated in response to coincidence of an output signal from said connected first gate circuit and said second trigger pulse to generate an output signal.

3. A receiver as claimed in claim 1 wherein each of said comparator circuits further include potential adjustment means connected to said rectifier means, operated to adjust the amount of fixed delay of said output signals.

4. A receiver as claimed in claim 1 wherein said rectifier means include a full wave rectifier and integrator means connected between said full wave rectifier and said comparator circuits.

5. A receiver as claimed in claim 1 wherein each of said gate circuits are connected to a different one of said comparator circuits through an inverter and a retriggerable monostable multivibrator.

6. A receiver as claimed in claim 1 wherein each of said second plurality of gate circuits are connected to a different one of said plurality of first gate circuits by an inverter.

7. A receiver as claimed in claim 2 wherein there are further icluded inhibit means connected between each of said comparator circuits and said second trigger means operated in response to an output signal from anyone of said comparator circuits to inhibit the operation of said second trigger means.

* * * * *